United States Patent
Lee et al.

(10) Patent No.: US 8,062,167 B2
(45) Date of Patent: Nov. 22, 2011

(54) CARRIER CUP OF PLANET CARRIER

(75) Inventors: Wang Kweon Lee, Hwaseong (KR); Hyun Ku Lee, Seoul (KR); Sang Bum Baek, Seoul (KR); Ki Jung Han, Suwon (KR); Seock Chan Kang, Gwangmyeong (KR); Jae Hyuk Choi, Gwacheon (KR); Kisoo Huh, Yongin (KR); Hyu Tae Shim, Hwaseong (KR); Woo Jin Chang, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 713 days.

(21) Appl. No.: 12/179,213

(22) Filed: Jul. 24, 2008

(65) Prior Publication Data
US 2009/0233756 A1    Sep. 17, 2009

(30) Foreign Application Priority Data
Mar. 12, 2008 (KR) .................. 10-2008-0022907

(51) Int. Cl.
*F16H 57/08* (2006.01)
(52) U.S. Cl. ..................... 475/331
(58) Field of Classification Search .......... 475/331, 475/313, 319, 325
See application file for complete search history.

(56) References Cited

U.S. PATENT DOCUMENTS

| | | | |
|---|---|---|---|
| 3,939,736 A * | 2/1976 | Morin | 475/338 |
| 4,187,740 A * | 2/1980 | Silvestri | 475/338 |
| 4,270,412 A * | 6/1981 | Beijer et al. | 475/331 |
| 6,422,971 B1 * | 7/2002 | Katou et al. | 475/331 |
| 6,434,827 B1 * | 8/2002 | Trent et al. | 29/893.1 |
| 6,743,148 B2 | 6/2004 | Hayabuchi et al. | |
| 7,641,581 B2 * | 1/2010 | Yamazaki | 475/252 |
| 2005/0192151 A1 * | 9/2005 | Simon | 475/331 |
| 2005/0192152 A1 * | 9/2005 | Kimes | 475/331 |

FOREIGN PATENT DOCUMENTS
EP    0271416 A1 * 11/1987
EP    0476395 A2 * 8/1991
* cited by examiner

*Primary Examiner* — Roger Pang
(74) *Attorney, Agent, or Firm* — Morgan, Lewis & Bockius LLP

(57) ABSTRACT

The present invention relates to a carrier cup of a planet carrier that improves strength thereof and reduces noise occurring in an automatic transmission by changing an interior circumferential shape of a leg. The carrier cup of a planet carrier according to an exemplary embodiment of the present invention at which pinion gears are mounted such that the pinion gears are rotatably supported thereby may include a carrier plate provided with a carrier hole for mounting a carrier shaft and a plurality of pinion holes for mounting the pinion gears, and a plurality of legs extending perpendicularly from one side surface of the carrier plate, wherein radial thickness of the leg is changed along a circumferential direction thereof.

7 Claims, 5 Drawing Sheets

CARRIER CUP OF PLANET CARRIER

CROSS-REFERENCE TO RELATED APPLICATION

This application claims priority to and the benefit of Korean Patent Application No. 10-2008-0022907 filed in the Korean Intellectual Property Office on Mar. 12, 2008, the entire contents of which are incorporated herein by reference.

BACKGROUND OF THE INVENTION (a) Field of the Invention

The present invention relates to a planet carrier. More particularly, the present invention relates to a carrier cup of a planet carrier that improves strength thereof and reduces noise occurring in an automatic transmission by changing an interior circumferential shape of a leg.

(b) Description of the Related Art

An automatic transmission controls a hydraulic pressure by operating at least one solenoid valve according to a driving state, such as a vehicle speed and a throttle opening, in order to perform shifting to a target shift speed.

In order to automatically shift to a target shift speed, the automatic transmission includes at least one of planetary gear sets. Such a planetary gear set includes a sun gear, a ring gear, and a planet carrier as operational members thereof, and a plurality of pinion gears, engaged with the sun gear and the ring gear, are connected to the planet carrier.

In addition, planetary gear sets are divided into simple planetary gear sets and compound planetary gear sets, and the simple planetary gear sets are divided into single pinion planetary gear sets and double pinion planetary gear sets.

The single pinion planetary gear set is a planetary gear set where one type of pinion gears is engaged with the sun gear and the ring gear, and the double pinion planetary gear set is a planetary gear set where two types of pinion gears are engaged with each other, one of them being engaged with the sun gear and the other being engaged with the ring gear.

A conventional planet carrier includes a carrier cup and a carrier cover.

The carrier cover is provided with a carrier hole formed at a middle portion thereof, and the carrier cup is provided with a carrier hole corresponding to the carrier hole of the carrier cover. Therefore, the carrier cup is connected to the carrier cover by a carrier shaft inserted in the carrier holes.

In addition, a plurality of pinion holes is formed at the carrier cover and the carrier cup around the carrier holes, and pinion shafts are inserted respectively in the pinion holes. A pinion gear is rotatably mounted at the pinion shaft.

The carrier cup includes a carrier plate and a plurality of legs formed perpendicularly to the carrier plate. The leg has an arc shape and covers a part of an exterior circumference of the pinion gear.

According to the conventional carrier cup of the planet carrier, the leg covering the part of the exterior circumference of the pinion gear has a uniform thickness regardless of the shape of the exterior circumference of the pinion gear, and thus a distance between the exterior circumference of the pinion gear and an interior circumference of the leg is not uniform. Therefore, a tilt error of the pinion shaft that occurs when the carrier cup is not mounted perpendicularly to the carrier cover is substantial, and more particularly such tilt error is greater in the double pinion planet carrier where more than two pinion gears are mounted at one leg. In a case that rotational members of the planetary gear set are rotated, the tilt error is a major cause of noise occurring in the automatic transmission.

In addition, since the thickness of leg is uniform, it is hard to strengthen the leg.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provides a carrier cup of a planet carrier having advantages of improving strength in an automatic transmission by maintaining a distance between a leg and a pinion gear to be uniform and partially increasing thickness of the leg.

A carrier cup of a planet carrier according to an exemplary embodiment of the present invention at which pinion gears are mounted such that the pinion gears are rotatably supported thereby may include a carrier plate provided with a carrier hole for mounting a carrier shaft and a plurality of pinion holes for mounting the pinion gears thereon; and a plurality of legs extending perpendicularly from one side surface of the carrier plate and receiving the pinion gears, wherein radial thickness of the leg is changed along a circumferential direction thereof.

The legs may extend perpendicularly from substantially exterior circumference of the one side surface of the carrier plate. An interior circumference of the leg may comprise a curved surface of a predetermined shape. Thicknesses of both ends of the leg may be different.

The curved surface of the predetermined shape may comprise a pinion receiving groove receiving a part of an exterior circumference of the pinion gear wherein curvatures of the curved surface and the pinion receiving groove are substantially the same such that a distance between the curved surface and the exterior circumference of the pinion gear is uniformly maintained along a circumferential direction thereof.

In another exemplary embodiment of the present invention, the planet carrier may be a double pinion planet carrier having first and second pinion gears, wherein the curved surface of the predetermined shape comprises: a first pinion receiving groove receiving a part of an exterior circumference of the first pinion gear; and a second pinion receiving groove receiving a part of an exterior circumference of the second pinion gear. Curvatures of the first pinion receiving groove and the first pinion gear may be substantially the same and curvatures of the second pinion receiving groove and the second pinion gear may be substantially the same.

In further another exemplary embodiment of the present invention, the planet carrier may be a single pinion planet carrier having a first pinion gear, wherein the curved surface of the predetermined shape comprises a first pinion receiving groove receiving a part of an exterior circumference of the first pinion gear. Curvatures of the first pinion receiving groove and the first pinion gear may be substantially the same.

The carrier cup of the present invention as an exemplary embodiment may have at least three legs and thicknesses of both ends of each leg may be different.

DETAILED DESCRIPTION OF THE EMBODIMENTS

An exemplary embodiment of the present invention will hereinafter be described in detail with reference to the accompanying drawings.

Figure 1:
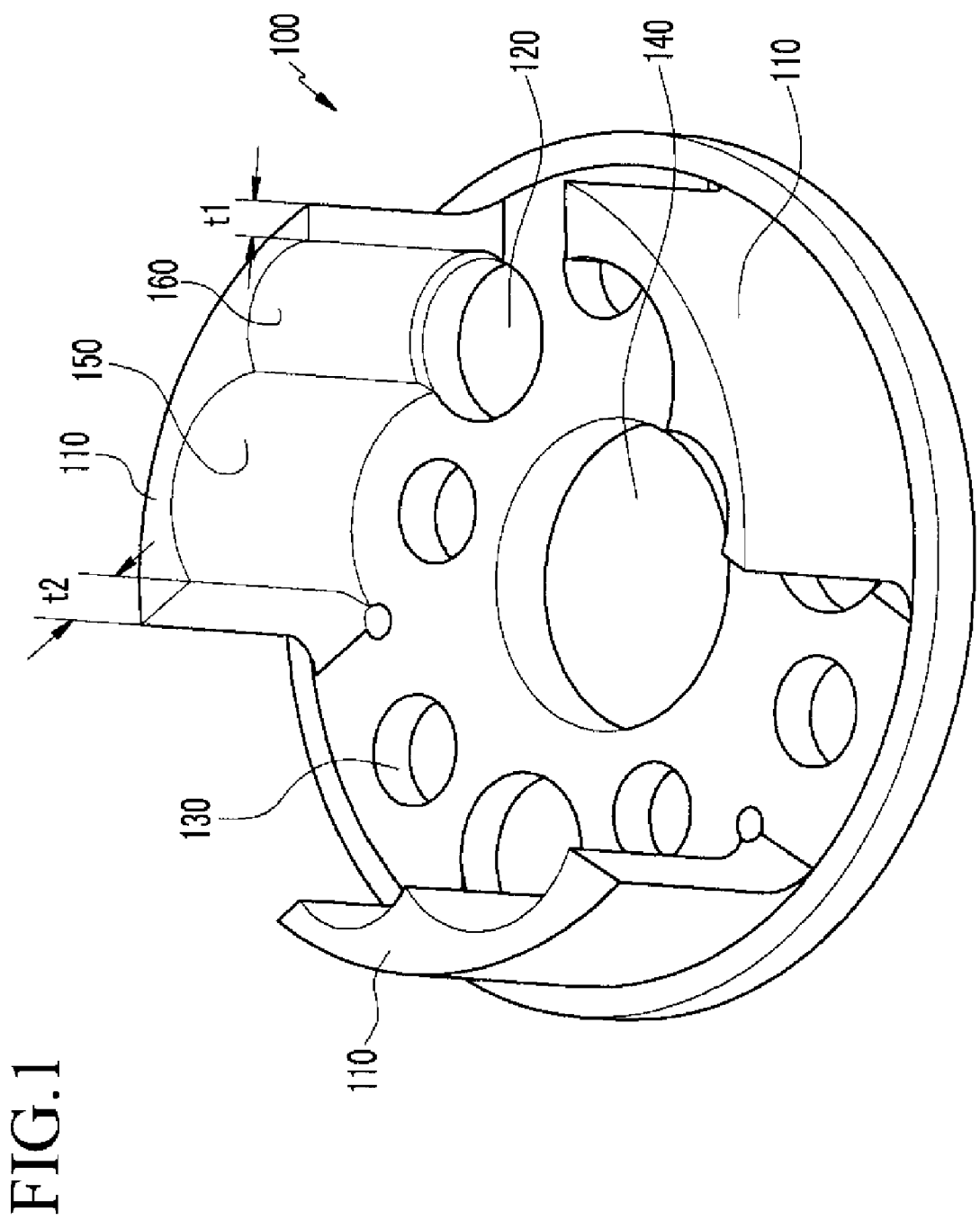
FIG. 1 is a perspective view showing a carrier cup of a planet carrier according to an exemplary embodiment of the present invention.
Figure 2:
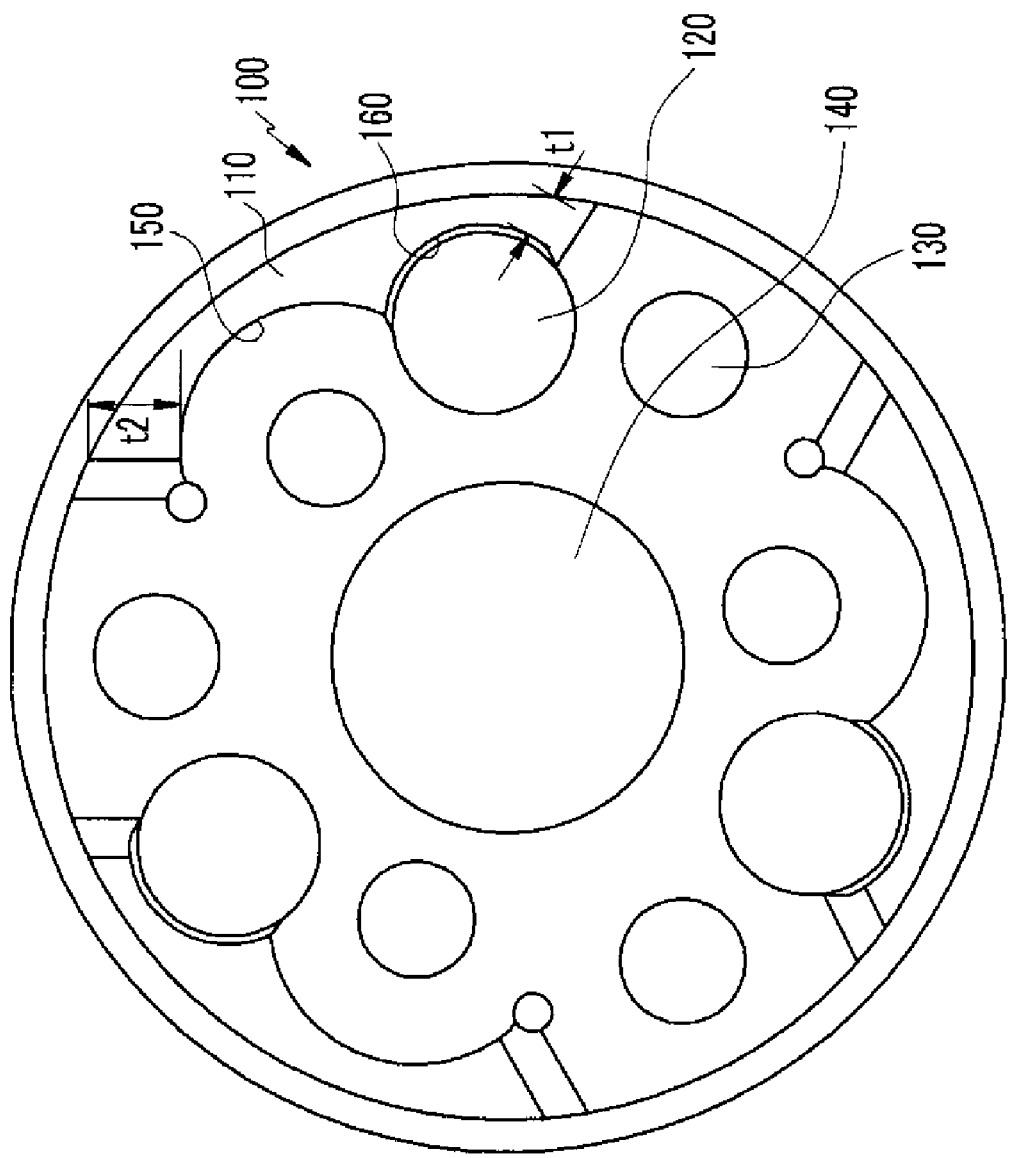
FIG. 2 is a front view showing a carrier cup of a planet carrier according to an exemplary embodiment of the present invention.

FIG. 1 is a perspective view showing a carrier cup of a planet carrier according to an exemplary embodiment of the present invention, and FIG. 2 is a front view showing a carrier cup of a planet carrier according to an exemplary embodiment of the present invention.

As shown in FIG. 1 and FIG. 2, a carrier cup of a planet carrier according to an exemplary embodiment of the present invention includes a carrier plate 100 and a plurality of legs 110.

The carrier plate 100 has a disk shape. A carrier hole 140 for mounting a carrier shaft (not shown) is formed at a middle portion thereof, and first and second pinion holes 120 and 130 for respectively mounting first and second pinion shafts (not shown) are formed around the carrier hole 140. The carrier shaft is inserted into the carrier hole 140 formed in the carrier plate 100 and a carrier hole (not shown) formed in the carrier cover and thus connects a carrier cup with a carrier cover (not shown). In addition, the first and second pinion shafts are inserted into the first and second pinion holes 120 and 130 and rotatably support first and second pinion gears (not shown), respectively, and thus the first and second pinion gears respectively rotate about the first and second pinion shafts.

According to an exemplary embodiment of the present invention, it is exemplarily described that the planet carrier is a double pinion planet carrier, but the spirit of the present invention cannot be limited to this and can be applied to a single pinion planet carrier. That is, a plurality of first pinion holes 120 for mounting the first pinion shaft may be formed at the carrier plate 100.

The legs 110 are extended perpendicularly from one side surface of the carrier plate 100. The number of the legs 110 may be at least three. An exterior circumference of each leg 110 has an arc shape, and an interior circumference of each leg 110 includes a curved surface of a predetermined shape. The curved surface of the predetermined shape covers a part of an exterior circumference of the pinion gear such that a distance between the curved surface and the exterior circumference of the pinion gear is uniformly maintained along a circumferential direction thereof.

In a case that the spirit of the present invention is applied to a double pinion planet carrier, the curved surface of the predetermined shape includes first and second pinion receiving grooves 160 and 150. As an exemplary embodiment of the present invention, the first pinion receiving groove 160 has a concave arc shape, the radius of which is substantially the same as that of the first pinion gear so as to cover a part of the exterior circumference of the first pinion gear, and the second pinion receiving groove 150 has a concave arc shape, the radius of which is substantially the same as that of the second pinion gear so as to cover a part of the exterior circumference of the second pinion gear.

Therefore, the curved surface of the predetermined shape for the interior circumference of the leg 110 is formed as a discontinuous curved surface where two concave circular arcs with different radii are connected to each other according to an exemplary embodiment of the present invention. The curved surface of the predetermined shape may be easily designed based on the number and radii of the pinion gears mounted in the leg 110 by a person of ordinary skill in the art.

In addition, in a case that the spirit of the present invention is applied to a single pinion planet carrier, the curved surface of the predetermined shape includes the first pinion receiving groove 160. The first pinion receiving groove 160 has a concave arc shape, the radius of which is substantially the same as that of the first pinion gear so as to cover a part of the exterior circumference of the first pinion gear. Further, a plurality of the first pinion receiving grooves 160 may be formed.

In a case that the leg 110 is configured such that the distance between the curved surface of the interior circumference and the pinion gear is uniformly maintained along the circumferential direction thereof, both ends of the leg 110 may have different thicknesses t1 and t2. Further, the radial thickness of the leg 110 may change continuously or discontinuously. Compared with a conventional carrier cup of a planet carrier, the radial thickness of the leg 110 increases partially or entirely, and accordingly strength of the leg 110 is enhanced.

Generally, the interior circumference of the leg 110 is close to the exterior circumference of the pinion gear. However, since the distance between the leg and the pinion gear is changed along the circumferential direction thereof according to the conventional carrier cup of the planet carrier, the pinion shaft may not be mounted perpendicularly to the carrier cup and the carrier cover.

However, since the distance between the leg 100 and the pinion gear is uniformly maintained along the circumferential direction thereof according to an exemplary embodiment of the present invention, the pinion shaft cannot be mounted if the pinion shaft is not perpendicular to the carrier cup 100 and the carrier cover. Therefore, a tilt error occurring in the planet carrier may be reduced.

Figure 3A:
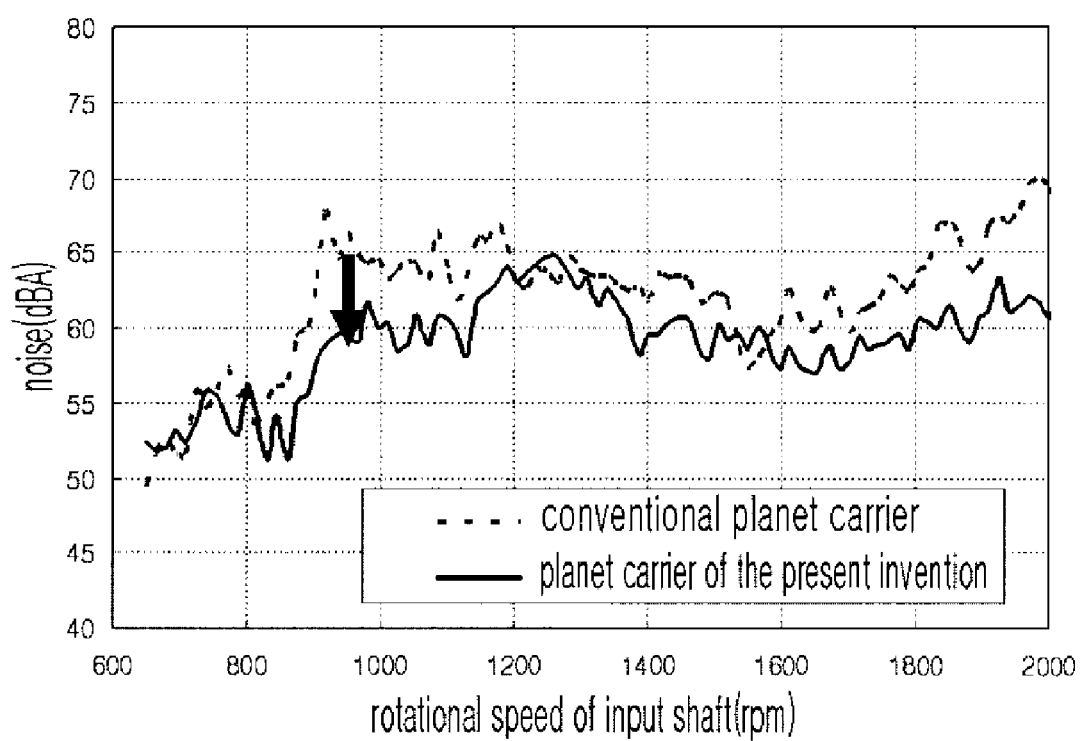
FIGS. 3A to 3C are graphs showing comparison of noise occurring at a carrier cup of a planet carrier according to an exemplary embodiment of the present invention and a conventional carrier cup of a planet carrier, respectively.
Figure 3B:
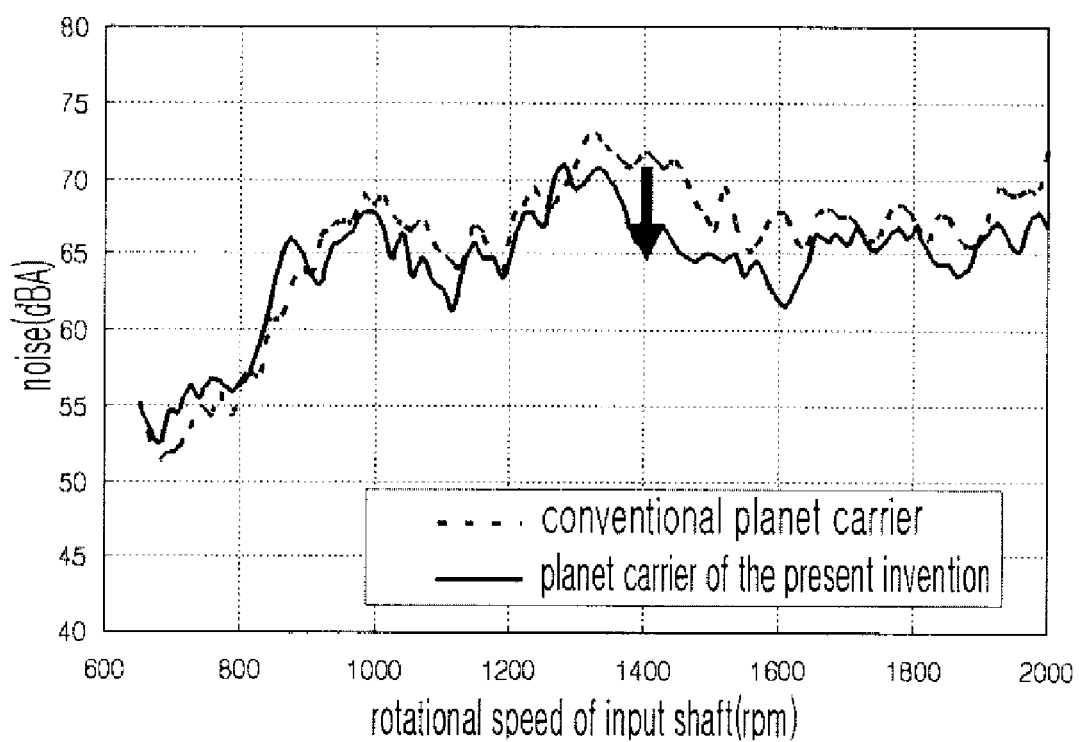
Figure 3C:
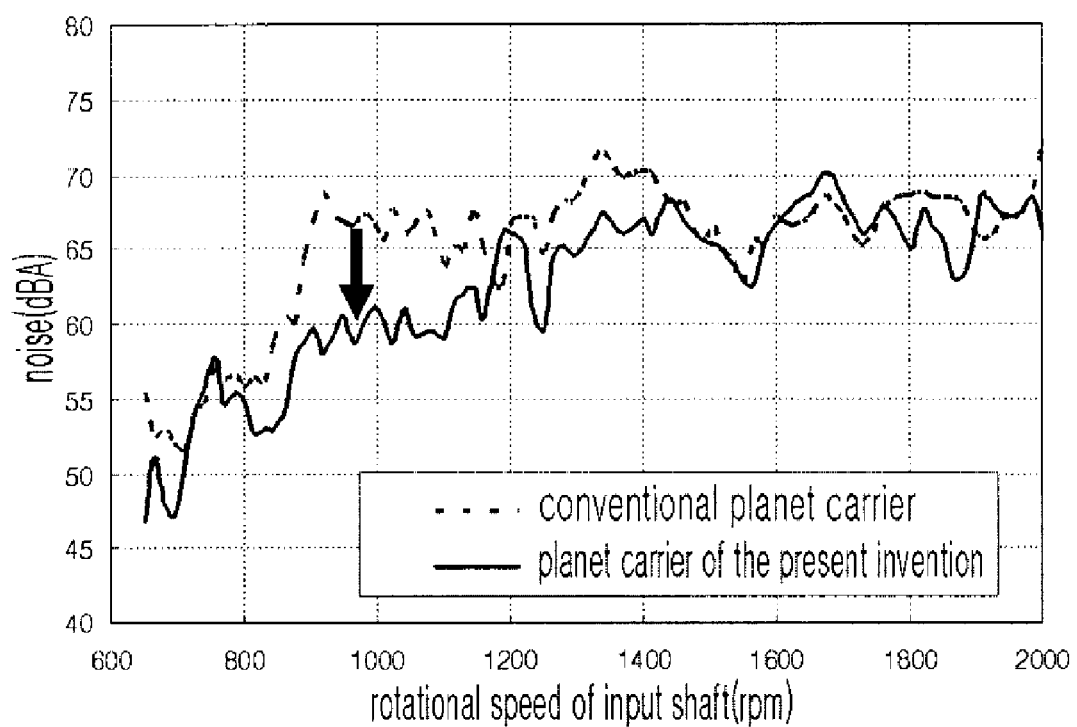

FIGS. 3A to 3C are graphs showing noise occurring at a carrier cup of a planet carrier according to an exemplary embodiment of the present invention and a conventional carrier cup of a planet carrier, respectively.

In FIGS. 3A to 3C, the dotted lines respectively represent noise that occurs in an automatic transmission using a conventional carrier cup of the planet carrier, and the solid lines respectively represent noise that occurs in an automatic transmission using a carrier cup of a planet carrier according to an exemplary embodiment of the present invention in FIG. 3.

As shown in FIGS. 3A to 3C, the noise occurring in the automatic transmission using the carrier cup of the planet carrier according to an exemplary embodiment of the present invention is less than the noise occurring in the automatic transmission using the conventional carrier cup of the planet carrier by 5-7 dBA over the entire region. That is, tilt error and noise occurring in the automatic transmission may be reduced according to an exemplary embodiment of the present invention.

As described above, since a distance between an exterior circumference of a pinion gear and an interior circumference of a leg is uniformly maintained along a circumferential direction thereof, the pinion gear may be mounted in the planet carrier safely and tilt error may be reduced. Therefore, noise that occurs in an automatic transmission may be reduced.

In addition, since an interior circumference of the leg is close to an exterior circumference of the pinion gear, thickness of the leg may be partially increased and strength of the planet carrier may be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A carrier cup of a planet carrier at which pinion gears are mounted such that the pinion gears are rotatably supported thereby, comprising:
    a carrier plate provided with a carrier hole for mounting a carrier shaft and a plurality of pinion holes for mounting the pinion gears thereon; and
    a plurality of legs extending perpendicularly from one side surface of the carrier plate and receiving the pinion gears,
    wherein at least one of the plurality of legs has substantially a uniform thickness extending from the one side surface of the carrier plate in a perpendicular direction, and an interior circumference of at least one of the plurality of legs includes a curved surface of at least two different intersecting curvatures to accommodate the pinion gears.

2. The carrier cup of claim 1, wherein the legs extends perpendicularly from substantially exterior circumference of the one side surface of the carrier plate.

3. The carrier cup of claim 1, wherein the planet carrier is a double pinion planet carrier having first and second pinion gears,
    wherein the curved surface comprises:
    a first pinion receiving groove receiving a part of an exterior circumference of the first pinion gear; and
    a second pinion receiving groove receiving a part of an exterior circumference of the second pinion gear.

4. The carrier cup of claim 3, wherein curvatures of the first pinion receiving groove and the first pinion gear are substantially the same and curvatures of the second pinion receiving groove and the second pinion gear are substantially the same.

5. The carrier cup of claim 1, wherein at least three legs are provided therein.

6. The carrier cup of claim 5, wherein radial thicknesses of both ends of each leg are different.

7. The carrier cup of claim 1, wherein radial thicknesses of both ends of the leg are different.

* * * * *